United States Patent [19]
Kim

[11] Patent Number: 5,940,775
[45] Date of Patent: Aug. 17, 1999

[54] METHOD OF AND APPARATUS FOR SELECTIVELY GENERATING INCOMING RING IN DIGITAL CORDLESS TELEPHONE

[75] Inventor: Kyou-Woong Kim, Seoul, Rep. of Korea

[73] Assignee: SamSung Electronics Co., Ltd., Suwon, Rep. of Korea

[21] Appl. No.: 08/775,113

[22] Filed: Dec. 30, 1996

[30] Foreign Application Priority Data

Dec. 30, 1995 [KR] Rep. of Korea ................... 95-67803

[51] Int. Cl.⁶ ............................. H04M 11/00; H04Q 7/00
[52] U.S. Cl. ..................... 455/567; 455/561; 455/524; 455/517; 455/575
[58] Field of Search .................... 455/414, 561, 455/567, 464, 508, 575, 517, 524, 462, 566, 435

[56] References Cited

U.S. PATENT DOCUMENTS

| | | | |
|---|---|---|---|
| 5,448,622 | 9/1995 | Huttunen | 379/58 |
| 5,479,477 | 12/1995 | McVey et al. | 379/58 |
| 5,509,052 | 4/1996 | Chia et al. | 379/61 |
| 5,553,125 | 9/1996 | Martensson | 379/140 |
| 5,606,597 | 2/1997 | Newland | 379/61 |
| 5,651,051 | 7/1997 | Stuart | 455/463 |
| 5,787,359 | 3/1996 | Nagata | 455/517 |
| 5,802,468 | 6/1995 | Gallant et al. | 455/422 |
| 5,802,477 | 1/1996 | Mizokami et al. | 455/525 |
| 5,805,999 | 2/1996 | Inoue | 455/462 |

*Primary Examiner*—Nguyen Vo
*Assistant Examiner*—Duc Nguyen
*Attorney, Agent, or Firm*—Robert E. Bushnell, Esq.

[57] ABSTRACT

A method for generating an incoming ring from a handset in response to an incoming call from only a selected one of base stations, in which the handset is registered for its operation, in a digital cordless telephone system. The digital cordless telephone system includes a plurality of base stations, and a handset operating while being registered at the base stations, the handset comprises a memory adapted to store a plurality of ring generation data respectively associated with a plurality of base stations, a central processing unit adapted to read the content of the memory when an incoming call is generated from one of the base stations, thereby identifying whether or not the memory is stored with ring generation data associated with the base station generating the incoming call, and a tone generator adapted to generate a ring tone associated with the identified ring generation data under the control of the central processing unit.

14 Claims, 5 Drawing Sheets

METHOD OF AND APPARATUS FOR SELECTIVELY GENERATING INCOMING RING IN DIGITAL CORDLESS TELEPHONE

This application makes claims all benefits accruing under 35 U.S.C. §119 from an application for METHOD OF AND APPARATUS FOR SELECTIVELY GENERATING INCOMING RING IN DIGITAL CORDLESS TELEPHONE earlier filed in the Korean Industrial Property Office on Dec. 30, 1995 and there duly assigned Ser. No. 67803/1995.

BACKGROUND OF THE INVENTION

1. Field of the Invention

The present invention relates to a method of and an apparatus for generating an incoming ring in a digital cordless telephone, and more particularly to a method for selectively generating an incoming ring from a mobile station, namely, a handset, in response to an incoming call from only a selected one of base stations in which the handset is registered for its operation.

2. Description of the Related Art

Generally, analog cordless telephone systems operate in such a manner that a limited number of handsets are registered in one base station in room environments such as homes or offices. On the other hand, digital cordless telephone systems operate in such a fashion that a plurality of handsets are registered at one base station. In particular, digital cordless telephone systems, such as second generation cordless telephone (CT2) systems, can operate not only in such a fashion that a plurality of handsets are registered at one base station, but also in such a fashion that, as shown in FIG. 1, each handset HS is registered at a plurality of base stations BS1, BS2, BS3, . . . , and BSn, respectively. In such digital cordless telephone systems, when an incoming call is generated, the base station receiving the incoming call polls all handsets registered therein in accordance with a ring generation protocol, which is shown in FIG. 2, so that all the handsets can generate incoming rings. In this case, the base station also sends data about its base station identification (hereinafter, referred to as "BID") upon polling the handsets. Accordingly, each handset checks whether or not the BID received therein is associated with one of the base stations in which it is registered. The handset generates an incoming ring when the BID received therein is associated with one of base stations in which it is registered.

However, the handset always generates incoming rings of the same characteristic irrespective of different base stations in which the handset is registered. As a result, the user of the handset can not recognize the base station which is associated with the generation of the incoming ring even though he can hear the incoming ring output from the handset. For this reason, where the user wants to receive only a call associated with the incoming ring from a desired base station, there is an inconvenience in that the user should directly identify the BID of the base station displayed on the display panel of the handset. It is impossible to identify the base station associated with the generation of the incoming ring without identifying the BID of the base station.

SUMMARY OF THE INVENTION

Therefore, an object of the invention is to provide a method for generating an incoming ring from a handset in response to an incoming call from only a selected one of base stations, in which the handset is registered for its operation, in a digital cordless telephone system.

Another object of the invention is to provide a method for generating different kinds of incoming rings from a handset in a digital cordless telephone system in association with respective base stations in which the handset is registered for its operation.

In order to accomplish these objects, the present invention provides a digital cordless telephone system comprising a plurality of base stations, and a handset operating while being registered at the base stations, the handset being stored with ring generation data respectively associated with the base stations. Since the handset is stored with different ring generation data respectively associated with particular base stations, it generates an incoming ring only when an incoming call is generated from one of the particular base stations. If the ring generation data can identify the base stations, respectively, then the user of the handset can identify the base station generating the incoming call, based on the incoming ring generated from the handset.

In accordance with the present invention, the handset comprises a memory adapted to store a plurality of ring generation data respectively associated with a plurality of base stations, a central processing unit adapted to read the content of the memory when an incoming call is generated from one of the base stations, thereby identifying whether or not the memory is stored with ring generation data associated with the base station generating the incoming call, and a tone generator adapted to generate a ring tone associated with the identified ring generation data under the control of the central processing unit. The memory can be a non-volatile memory. The ring generation data stored in the memory are different in sound, interval and amplitude for different base stations, respectively.

When the memory is stored with no ring generation data in association with a base station which generates an incoming call, the central processing unit carries out a control for generating, by the tone generator, a tone corresponding to a particular one of the ring generation data stored in the memory. On the other hand, the handset further comprises a display for displaying the BID of the base station generating the incoming call, and a key pad for allowing the user to modify the ring generation data stored in the memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following description of the present invention, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole content of this specification because it may be changed in accordance with the option of a chip designer or a usual practice.

Figure 1:
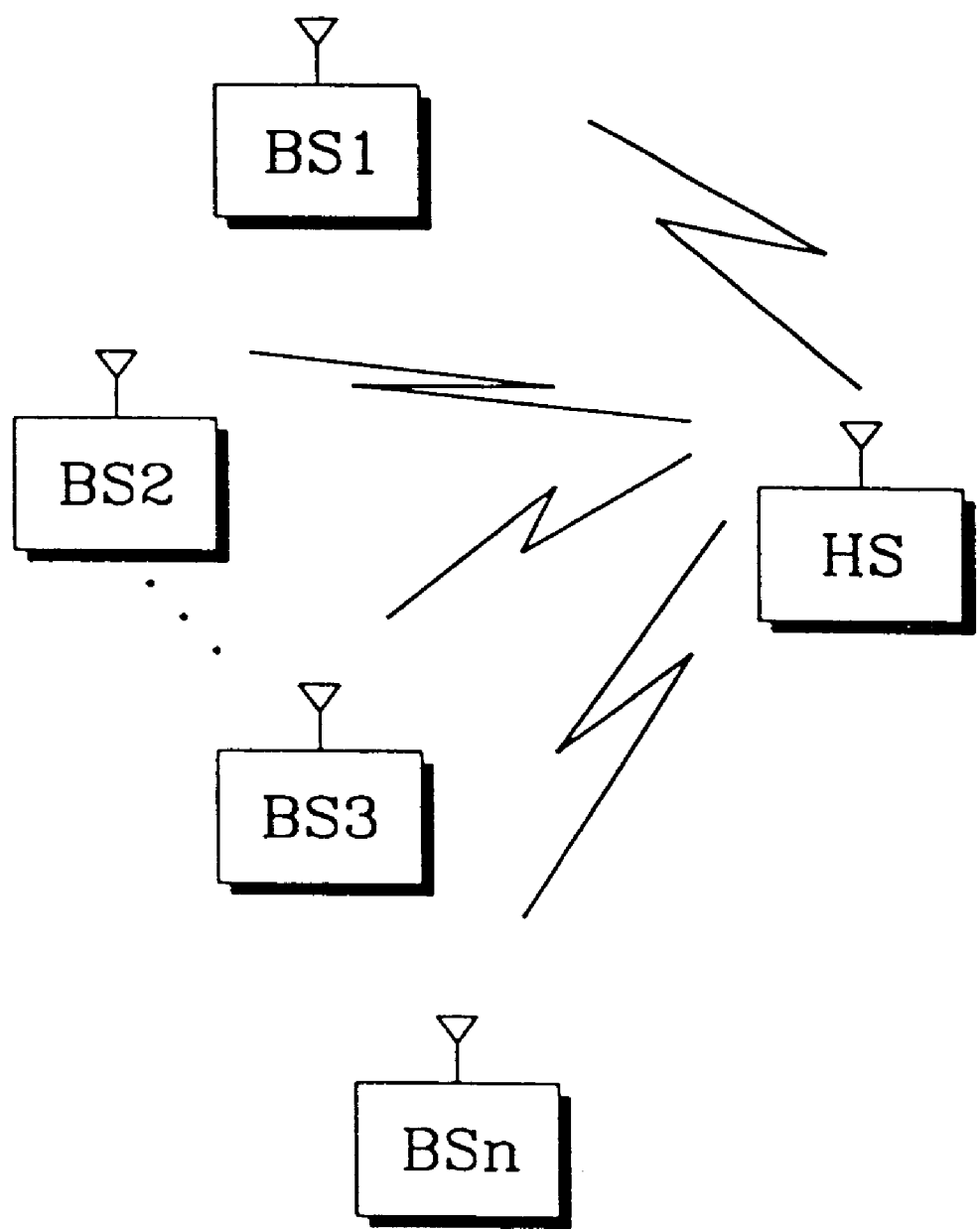
FIG. 1 is a schematic view illustrating a digital cordless telephone system in which a handset operates while being registered at a plurality of base stations.
Figure 2:
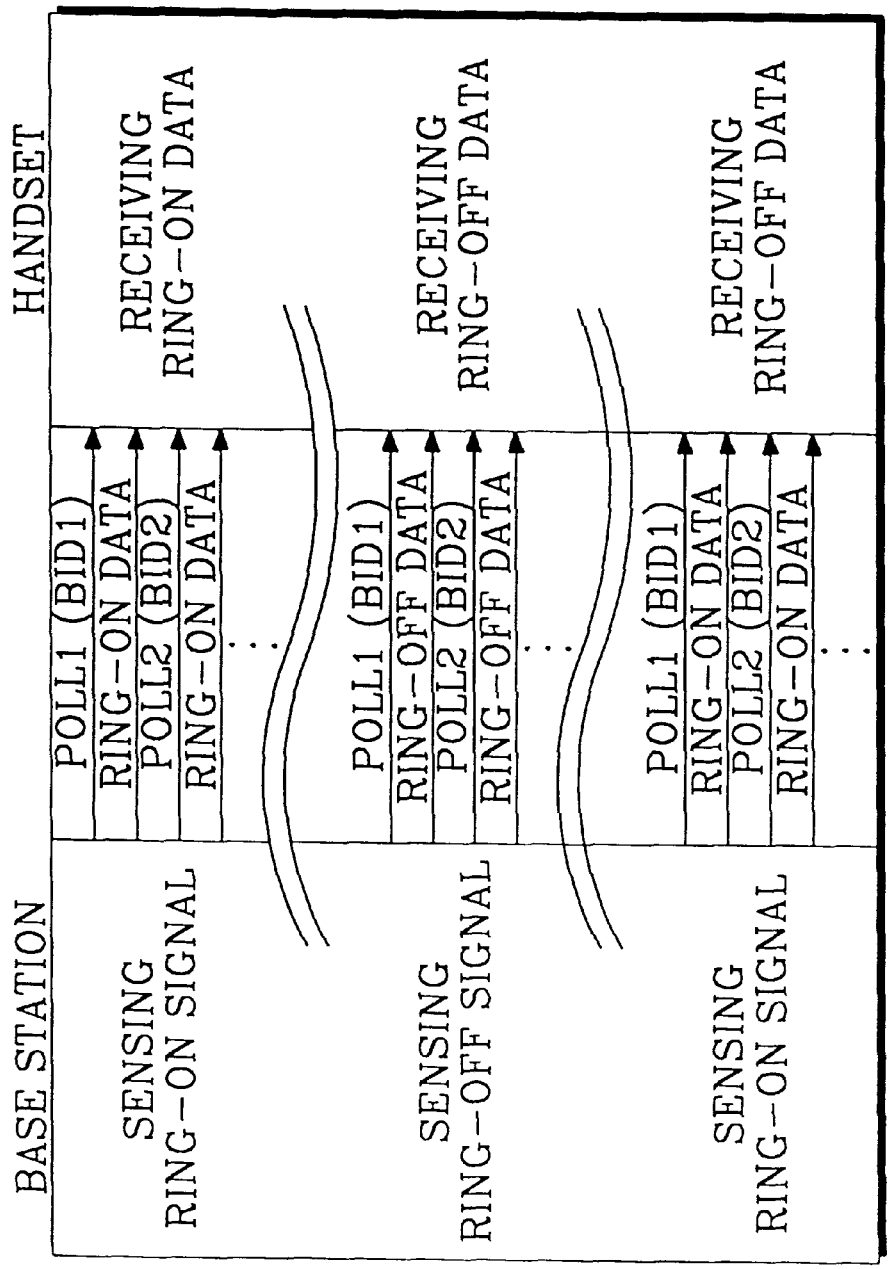
FIG. 2 is a diagram illustrating a general ring generation protocol.
Figure 3:
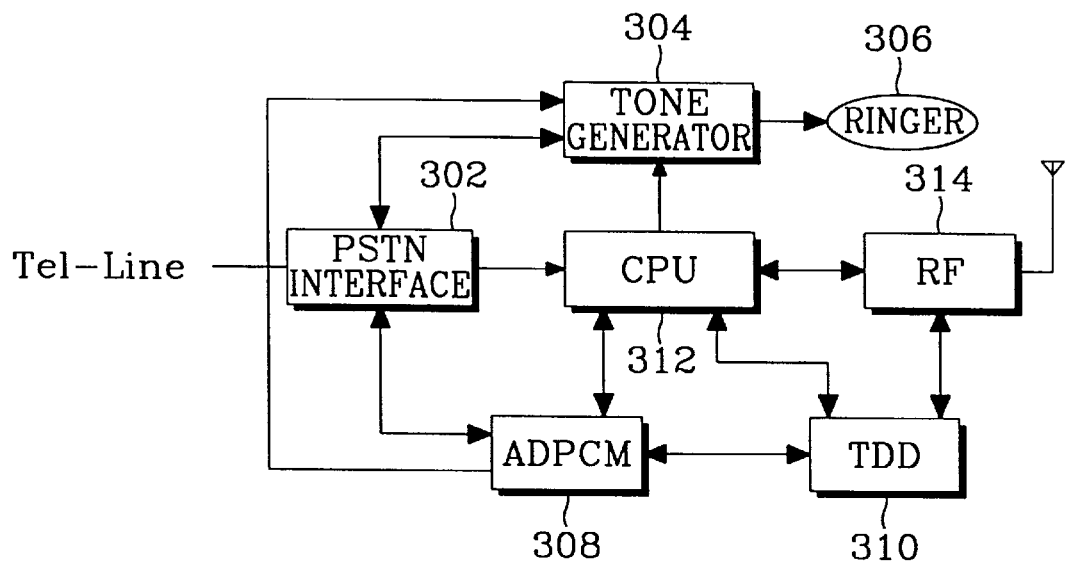
FIG. 3 is a block diagram illustrating the configuration of a base station included in a digital cordless telephone system to which the present invention is applied.
Figure 4:
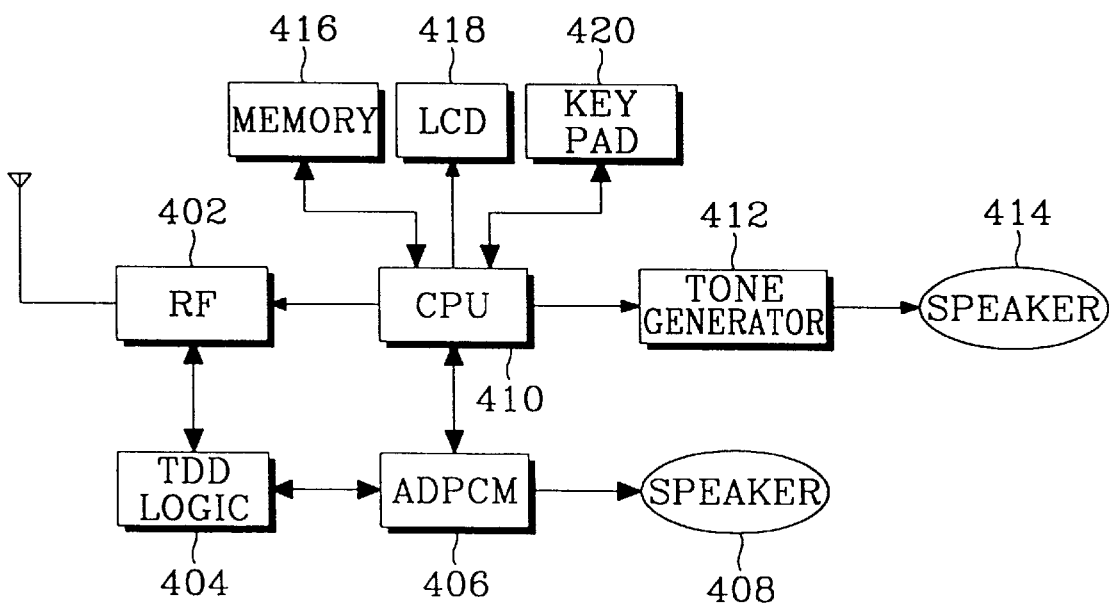
FIG. 4 is a block diagram illustrating the configuration of a handset included in a digital cordless telephone system to which the present invention is applied.

Ring generation and call operations carried out in base stations and handsets in a digital cordless telephone system according to the CT2-CAI (Common Air Interface) standard, to which the present invention is applied, will now be described in conjunction with FIGS. 3 and 4. FIG. 3 is a block diagram illustrating the configuration of a private base station included in the digital cordless telephone system to which the present invention is applied. On the other hand, FIG. 4 is a block diagram illustrating the configuration of an handset included in the digital cordless telephone system to which the present invention is applied.

As shown in FIG. 3, the base station includes a public switched telephone network (PSTN) interface 302 which serves to provide a ring signal and a line signal while controlling off-hook and on-hook operations. A central processing unit (CPU) 312 is coupled to the PSTN interface 302 to detect a ring signal from the PSTN interface 302. When the CPU 312 detects a ring signal from the PSTN interface 302, it controls an adaptive differential pulse code modulation (ADPCM) unit 308 to produce ring data meeting the CT2-CAI standard. The ring data is then sent to handsets via a radio frequency (RF) transmitter/receiver 314. Each handset, which is shown in FIG. 4, receives the ring data transmitted from the base station in accordance with the CT2-CAI. As shown in FIG. 4, the handset includes an RF transmitter/receiver 402 adapted to receive the ring data from the base station. The ring data from the RF transmitter/receiver 402 is then sent to a time division duplex (TDD) logic 404 which, in turn, separates control data from the ring data. The control data is transmitted to a CPU 410 via an ADPCM unit 406. In response to the control data, the CPU 410 controls a tone generator 412 to generate a ring signal to a ringer, namely, to a speaker 414. When the user of the handset depresses a call button on a key pad 420 equipped in the handset in response to the ring signal, the CPU 410 controls the TDD logic 404 to produce control data. The produced data is transmitted to the base station via the RF transmitter/receiver 402.

Data transmitted from the handset is then received at the RF transmitter/receiver 314 of the base station shown in FIG. 3. From the received data, control data is separated and then applied to the CPU 312. In response to the control data, the CPU 312 controls a hook controller included in the PSTN interface 302, thereby switching the hook controller to an off-hook state. In the off-hook state of the hook controller, a line signal from a telephone line connected to the PSTN interface 302 is applied to the ADPCM unit 308. The line signal is converted into digital data by the ADPCM 308 and then processed along with control data, which is generated from the CPU 312 based on the line signal applied to the CPU 312. The resultant data is transmitted to the handset via the RF transmitter/receiver 314. The data transmitted from the base station is received at the RF transmitter/receiver 402 of FIG. 4 and then applied to the TDD logic 404 in which the data is, in turn, separated into speech data and control data. The separated control data is sent to the CPU 410 whereas the speech data is converted into a speech signal by the ADPCM 406. The speech signal is then sent to a speaker 408.

The present invention is characterized in that when the handset receives ring data from the base station, its CPU 410 identifies ring generation data associated with the BID of the base station and then executes a processing for generating the identified ring generation data. This operation is enabled by appropriately setting ring generation data associated with respective BID's of a plurality of base stations in which the handset is registered. Since an incoming ring is generated in the form of a tone by a tone generator 412 included in the handset, the setting of ring generation data can be achieved by setting different sounds, intervals and amplitudes of tones for different base stations, respectively. For reference, the memory of a conventional handset is stored with only BID's of base stations in which the handset is registered. In accordance with the present invention, however, the memory of the handset is stored with not only BID's of associated base stations, but also ring generation data respectively associated with the BID's. In FIG. 4, the memory of the handset is denoted by the reference numeral 416. The memory 416 can be a non-volatile memory such as an EEPROM. The operation of setting ring generation data can be carried out when the handset is initially registered at base stations. Alternatively, the setting operation can be carried out later in a ring generation data setting mode of the handset. In the latter case, the setting of ring generation data can be achieved using the key pad 420.

When an optional one of the base stations, in which a handset is registered, senses an incoming call at its PSTN interface under the condition in which ring generation data of different ring types respectively set for all the base stations are stored with the memory (denoted by the reference number 416 in FIG. 4) of the handset, it polls handsets registered therein. Each handset then selectively generates an incoming ring in accordance with a processing procedure shown in the flow chart of FIG. 5.

Figure 5:
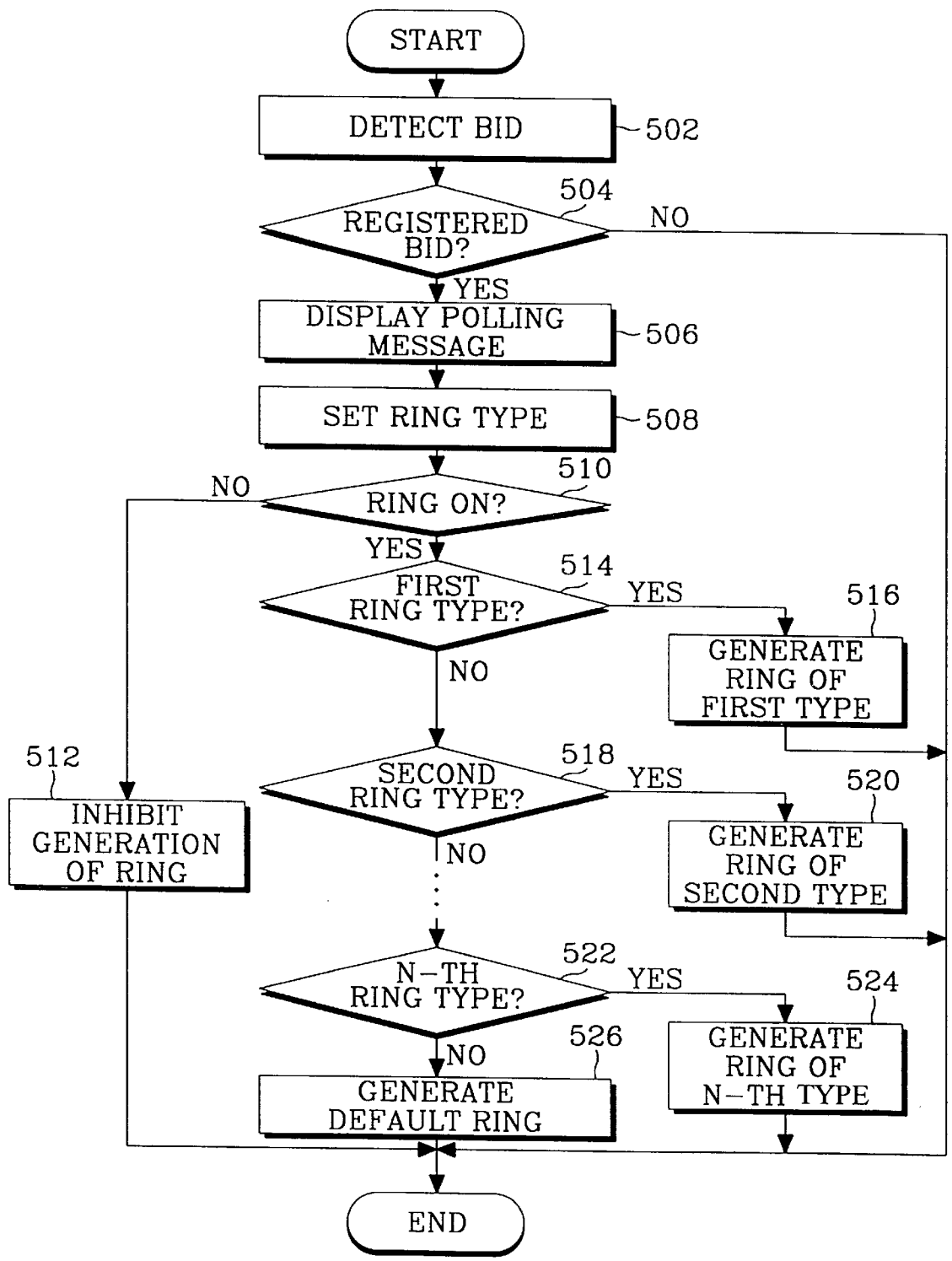
FIG. 5 is a flow chart illustrating a procedure of selectively generating an incoming ring in accordance with the present invention.

That is, when the handset receives ring data at its RF transmitter/receiver 402, the CPU 410 thereof detects a BID from the received ring data at step 502 of FIG. 5. At step 504, it is determined whether or not the detected BID is associated with one of the base stations in which the handset is registered. If it is determined that the detected BID is associated with one of the base stations in which the handset is registered, then the CPU 410 controls an LCD 418 included in the handset to display a polling message at step 506. At step 508, the CPU 410 also sets the ring type of ring generation data, which is stored in the memory 416, based on the detected BID. Thereafter, it is determined at step 510 whether or not the type-set ring generation data is indicative of the generation of an incoming ring. If the type-set ring generation data is indicative of the inhibition of the generation of an incoming ring, then the CPU 410 controls the tone generator 412 to inhibit the generation of an incoming ring at step 512. On the other hand, where the type-set ring generation data is indicative of the generation of an incoming ring, steps 514 to 524 are executed to identify the type of the ring generation data, thereby generating an incoming ring corresponding to the identified ring type. The identification procedure is executed in a sequential manner for n ring types until the ring type of the ring generation data is identified. For instance, the identification operation is first executed for a first ring type at step 514. When it is determined at step 514 that the ring generation data is not set to the first ring type, the identification procedure proceeds to the next step 518 associated with a second ring type. In this way, the identification procedure is repeated until the type of the ring generation data is identified. When the ring type of the ring generation data is identified at a certain step, a procedure of generating an incoming ring corresponding to the identified ring type is executed. For example, when it is determined at step 518 that the ring generation data is set to the second ring type, the CPU 410 controls the tone generator 412 at step 520 to generate an incoming ring corresponding to the ring generation data which is set to the second ring type.

On the other hand, where the ring generation data is not set to any one of the n ring types, the CPU 410 controls the tone generator 412 to generate a default ring at step 526. Such a default ring can be set to any one of the ring generation data stored in the memory 416.

Figure 6:
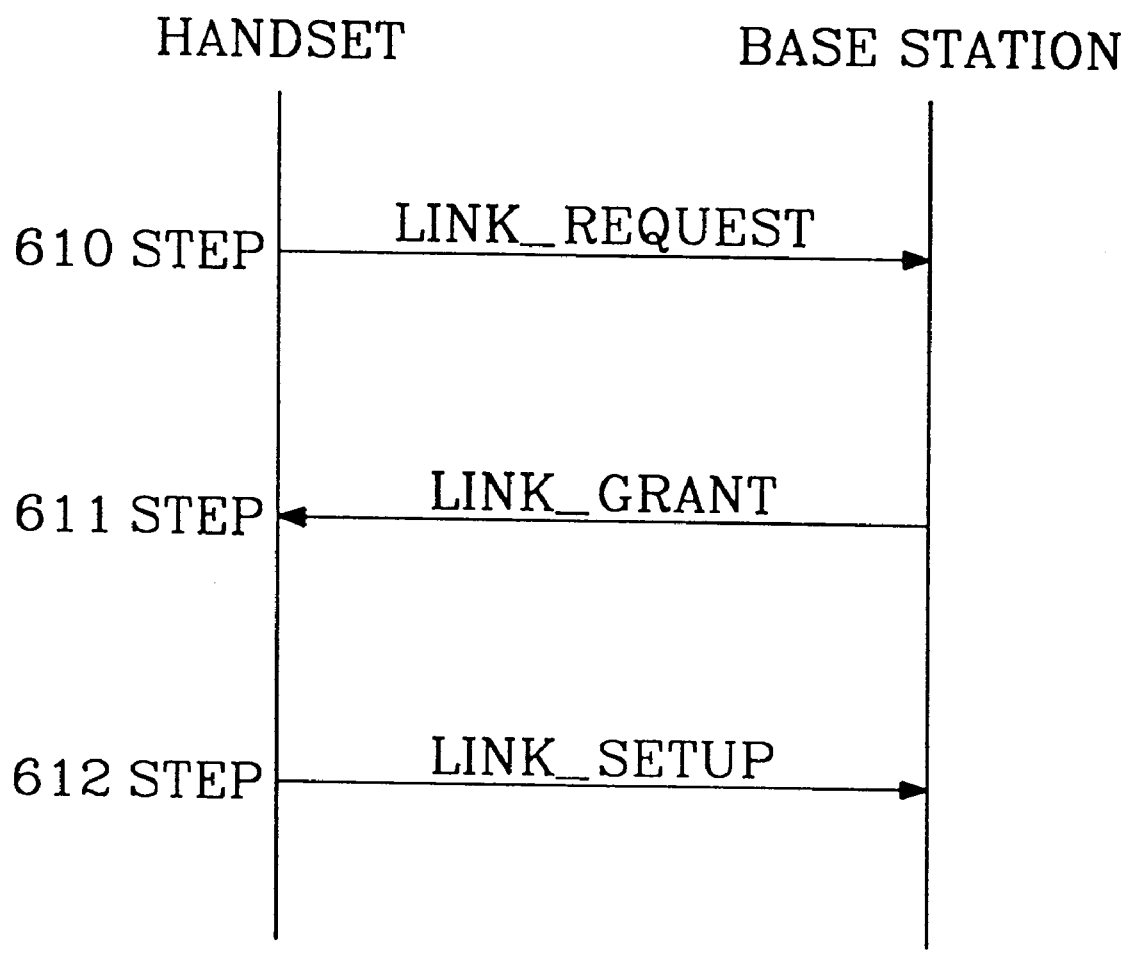
FIG. 6 is a diagram illustrating a general link setup protocol.

When the user of the handset depresses the call button on the key pad 420 in response to the generated incoming ring, a procedure according to a general link setup protocol is executed in the handset as shown in FIG. 6. That is, the CPU 410 controls the TDD logic 404 to generate a link request message LINK_REQUEST for requesting the establishment of a link at step 610 of FIG. 6. When the base station, which polls the handset, receives the link request message LINK_REQUEST, it stops its polling operation and then sends a link grant message LINK_GRANT for granting the requested link, to the handset. This procedure is executed at step 611. In response to the link grant message LINK_GRANT, the handset sends a link setup message LINK_SETUP to the base set at step 612. In this way, a desired link is established.

Even in the case wherein the handset is set by ring generation data indicative of the inhibition of the generation of a ring, the BID of the current base station is displayed on the LCD of the handset. Accordingly, the user can establish a link between the handset and base station by depressing the call button on the key pad of the handset although the handset is set by ring generation data indicative of the inhibition of the generation of a ring.

As apparent from the above description, in accordance with the present invention, a handset is set by ring generation data respectively associated with base stations in which the handset is registered. Accordingly, when an incoming call is generated from one of the base stations, an incoming ring corresponding to the base station associated with the incoming call is selectively generated. In accordance with the present invention, therefore, there is an advantage in that the user of the handset can identify the base station generating the incoming call even in environments such as offices, wherein a plurality of base stations and a plurality of handsets are complicatedly coupled. In accordance with the present invention, it is possible to generate incoming rings respectively associated with incoming calls from only desired base stations. Therefore, it is possible to prevent a plurality of handsets from simultaneously generating a ring, thereby reducing the generation of noise. Even in the case wherein a handset generates no ring in response to an incoming call from a base station, the user can receive a call from the base station because the user can identify the BID of the base station displayed on the LCD of the handset.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for generating an incoming ring from a handset in a digital cordless telephone system, comprising the steps of:

generating an incoming call from a base station of a plurality of base stations at which the handset is registered;

identifying whether for the base station generating the incoming call an incoming ring generation mode is set; and generating an incoming ring corresponding to the base station generating the incoming call only when the incoming ring generation mode is set.

2. The method according to claim 1, further comprising the step of generating an incoming ring corresponding to analyzed ring generation data set for the base station generating the incoming cal when the incoming ring generation mode is set.

3. A method for generating an incoming ring from a handset in a digital cordless telephone system, comprising the steps of:

setting a plurality of ring generation data respectively associated with a plurality of base stations;

generating an incoming call from a base station of the plurality of base stations at which the handset is registered;

analyzing ring generation data set for the base station generating the incoming call; and generating an incoming ring corresponding to the analyzed ring generation data set for the base station generating the incoming call.

4. A digital cordless telephone system, comprising:

a plurality of base stations; and a handset, the handset for operating while being registered at the plurality of base stations, wherein the handset comprises a memory for storing a plurality of ring generation data each respectively associated with one of the plurality of base stations, a central processing unit for reading the content of the memory when an incoming call is generated from one of the plurality of base stations for identifying whether ring generation data associated with the base station generating the incoming call is stored in the memory, and a tone generator for generating a ring tone associated with ring generation data identified with the base station generating the incoming call under the control of the central processing unit.

5. The digital cordless telephone system according to claim 4, wherein the central processing unit controls the tone generator that when no ring generation data is stored in the memory in association with the base station which generates an incoming call, the tone generator generates a tone corresponding to a particular one of the ring generation data stored in the memory.

6. The digital cordless telephone system according to claim 5, wherein the handset further comprises a display for displaying an intrinsic identification of the base station generating the incoming call, and the handset further comprises a key pad for allowing a user of the handset to modify the ring generation data stored in the memory.

7. The digital cordless telephone system according to claim 6, wherein the ring generation data stored in the memory are different in sound, interval and amplitude for each of the plurality of base stations, respectively.

8. The digital cordless telephone system according to claim 5, wherein the ring generation data stored in the memory are different in sound, interval and amplitude for each of the plurality of base stations, respectively.

9. The digital cordless telephone system according to claim 4, wherein the handset further comprises a display for displaying an intrinsic identification of the base station generating the incoming call.

10. The digital cordless telephone system according to claim 4, wherein the ring generation data stored in the memory are different in sound, interval and amplitude for each of the plurality of base stations, respectively.

11. The digital cordless telephone system according to claim 4, wherein the memory comprises a non-volatile memory.

12. The digital cordless telephone system according to claim 4, wherein the handset further comprises a key pad for allowing a user of the handset to modify the ring generation data stored in the memory.

13. The digital cordless telephone system according to claim 4, wherein the handset further comprises a display for displaying an intrinsic identification of the base station generating the incoming call, and the handset further comprises a key pad for allowing a user of the handset to modify the ring generation data stored in the memory.

14. The digital cordless telephone system according to claim 13, wherein the ring generation data stored in the memory are different in sound, interval and amplitude for each of the plurality of base stations, respectively.

* * * * *